United States Patent
Kenny et al.

(10) Patent No.: US 10,746,980 B2
(45) Date of Patent: Aug. 18, 2020

(54) CALIBRATION OF MICROSCOPY SYSTEMS

(71) Applicant: GENERAL ELECTRIC COMPANY, Schenectady, NY (US)

(72) Inventors: Kevin Bernard Kenny, Niskayuna, NY (US); Alex David Corwin, Niskayuna, NY (US); David Andrew Shoudy, Niskayuna, NY (US); Christine Lynne Surrette, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 14/934,412

(22) Filed: Nov. 6, 2015

(65) Prior Publication Data

US 2016/0170197 A1 Jun. 16, 2016

Related U.S. Application Data (63) Continuation-in-part of application No. 14/469,362, filed on Aug. 26, 2014, now Pat. No. 9,797,767.

(51) Int. Cl.
| | |
|---|---|
| *G02B 21/36* | (2006.01) |
| *H04N 17/00* | (2006.01) |
| *H04N 5/262* | (2006.01) |
| *H04N 5/235* | (2006.01) |
| *H04N 5/217* | (2011.01) |
| *G01N 21/27* | (2006.01) |
| *G01J 1/02* | (2006.01) |
| *G01N 21/64* | (2006.01) |

(52) U.S. Cl.
CPC .......... *G02B 21/365* (2013.01); *G01J 1/0228* (2013.01); *G01N 21/274* (2013.01); *G01N 21/6458* (2013.01); *H04N 5/2173* (2013.01); *H04N 5/2351* (2013.01); *H04N 5/2628* (2013.01); *H04N 17/002* (2013.01)

(58) Field of Classification Search
CPC .................................................. G02B 21/365
See application file for complete search history.

(56) References Cited

U.S. PATENT DOCUMENTS

| | | |
|---|---|---|
| 6,285,498 B1 | 9/2001 | Mayer |
| 7,698,000 B2 | 4/2010 | Silberberg et al. |
| 7,902,526 B2 | 3/2011 | Kim et al. |
| 8,390,682 B2 | 3/2013 | Minamide |

(Continued)

FOREIGN PATENT DOCUMENTS

| | | | |
|---|---|---|---|
| GB | 2447129 | 9/2008 | |
| WO | WO-2010033508 A1 * | 3/2010 | ........... G06T 7/0012 |

(Continued)

*Primary Examiner* — John E Breene
*Assistant Examiner* — Jeffrey C Morgan
(74) *Attorney, Agent, or Firm* — Eversheds Sutherland (US) LLP (57) ABSTRACT

Approaches are disclosed for calibrating a plurality of imaging devices, such as microscopes. In certain implementations, a calibration plate is employed that includes a variety of calibration features. The calibration features comprise a geometric calibration, an illumination calibration, and an optical calibration. Imaging devices calibrated in accordance with the present approaches may be used to generate images having consistent attributes, such as brightness, regardless of which imaging device is employed.

25 Claims, 10 Drawing Sheets

(56) References Cited

U.S. PATENT DOCUMENTS

| | | | |
|---|---|---|---|
| 8,427,635 B2 | 4/2013 | Christiansen et al. | |
| 8,563,913 B2 | 10/2013 | Dowski et al. | |
| 8,570,649 B2 | 10/2013 | Truong et al. | |
| 2009/0147355 A1* | 6/2009 | Jennings | G02B 21/26 |
| | | | 359/391 |
| 2010/0097443 A1* | 4/2010 | Lablans | G03B 37/00 |
| | | | 348/36 |

FOREIGN PATENT DOCUMENTS

| | | |
|---|---|---|
| WO | 2012096721 A1 | 7/2012 |
| WO | 2013049646 A1 | 4/2013 |

* cited by examiner

$$[x\ y\ z\ 1]_{stage} = [x\ y\ z\ 1]_{slide} \cdot A_1 \cdot A_2$$

$$A_1 = \underbrace{A_{aa}}_{\substack{\text{Auto-align} \\ \text{transform to} \\ \text{baseline round}}} \cdot \underbrace{R_y \cdot R_x \cdot M_x \cdot M_y \cdot R_z \cdot T_{xyz}}_{\substack{\text{Holder-spacific} \\ \text{rotations, mirroring,} \\ \text{and translations}}}$$

$$A_2 = \underbrace{M_{ideal}^{-1}}_{\substack{\text{Scope stage} \\ \text{transform}}} \cdot \underbrace{M_{ideal}^{-1}}_{\substack{\text{Idealized} \\ \text{stage matrix}}} \cdot \underbrace{A_{meas}}_{\substack{\text{Measured} \\ \text{stage} \\ \text{transform}}} \cdot \underbrace{M_{plate_N}}_{\substack{\text{Stored} \\ \text{calibration} \\ \text{plate} \\ \text{transform} \\ \text{(cal. plate} \\ \text{traceability)}}}$$

$$M_{plate_N} = \underbrace{A_{meas_{master}}}_{\substack{\text{Measured} \\ \text{master plate} \\ \text{stage transform}}} \cdot \underbrace{A_{meas_{plate_N}}^{-1}}_{\substack{\text{Measured plate} \\ \text{stage transform}}}$$

CALIBRATION OF MICROSCOPY SYSTEMS

REFERENCE

This application is a continuation-in-part of co-pending U.S. patent application Ser. No. 14/469,362, filed Aug. 26, 2014, the disclosure of which is incorporated herein by reference in its entirety.

BACKGROUND

The subject matter disclosed herein relates to acquisition and analysis of images of biological samples. More particularly, the disclosed subject matter relates to the calibration of microscopes used in such image acquisition protocols.

Certain types of molecular pathology examinations utilize a multiplexing workflow for molecular pathology imaging. When generating images using such a multiplexing workflow, a single slice of tissue (i.e., a single sample) may be used. The multiplexing workflow allows images of the tissue sample acquired over multiple rounds of imaging to be layered, with each round of imaging being directed to a different set of biomarkers applied to the sample; thus creating a composite view or image of the single sample. As such, the combination of biomarkers acquired over multiple rounds of imaging, displayed as a comprehensive view of tissue composition, provides for advanced analysis and diagnosis of the sample.

In certain workflows it would be advantageous to use different microscopes to obtain the images to be layered in creating the composite image. For a given lab with multiple microscopes, one problem arises with regard to load-balancing a fleet of microscopes performing multi-round imaging when, for example, one microscope is down for repair, or, alternatively, is backed up with many tissue samples that are tied to the microscope for the duration of the multi-round imaging process and are waiting for their additional rounds of imaging while other microscopes sit idle. Among the problems that may exacerbate management of multiple microscopes in such an arrangement is the need to calibrate (e.g., optically, geometrically, illumination, and so forth) all microscopes within a given lab relative to one another so that the layered images that are produced within a given lab are of high quality and are consistent over time, regardless of the microscope employed. To solve this problem, a comprehensive calibration process that enables microscope-independent imaging must be developed. Further, to minimize downtime of the microscopes and to maximize the throughput (the number of tissue slides imaged per day) in the lab, the calibration process should be as fast and efficient as possible.

When moving towards microscope-independent imaging, all microscopes need to be calibrated relative to each other through the use of a common reference standard to compensate for such factors as optical distortion, objective magnification, stage scale, stage rotation, stage offsets, and camera rotation. In some instances the reference standard could be a master microscope, while in other cases the reference standard could be an expected reference value for each calibration parameter from which offsets and ratios are computed relative to. By using a master microscope as the reference, the validity of the calibrations of all microscopes becomes vulnerable to changes or failures of the master microscope. When a change in the master microscope occurs, each microscope, including the master would need to be recalibrated. Relative traceability between the remaining microscopes could be obtained by designating a new master microscope to reinstate the traceability from. The problem with this approach is that any microscope could suffer a change or degradation in one or more properties at any time and therefore the validity of the inter-microscope calibrations could always be questioned.

Due to these reasons, the preferred approach is to use reference values or idealized models for each calibration parameter and calibrate each microscope relative to these parameters. The reference values do not change and therefore each microscope can be considered independently and calibrated independently to the standard. Periodic checks or routine automated calibrations can then be used to determine if any of the calibration parameters have deviated too far from their calibrated values and recalibrate if necessary.

Thus there remains a need for methods and devices to allow for accurate and reproducible inter-microscope calibration for registering images.

BRIEF DESCRIPTION

In one embodiment, a method is provided for inter-microscope calibration comprising, loading a calibration plate onto a microscope stage such that the calibration plate is positioned in the focal plane of at least one objective lens of the microscope and executing a calibration routine that generates a set of calibration data for the microscope. The calibration data is comprised of a geometric calibration, an illumination calibration, and an optical calibration, and is stored on a memory accessible by the microscope.

In another embodiment, a method is provided for acquiring images for image registration on different microscopes. The method comprises receiving an imaging protocol specifying one or more image acquisition parameters for imaging a sample on a stage of a calibrated microscope. The image acquisition parameters comprise a geometric calibration, an illumination calibration, and an optical calibration.

In still another embodiment a method for inter-microscope calibration is provided where the method is performed on multiple microscopes such that the microscopes can be used interchangeably utilizing the stored calibration data. The method comprises loading a calibration plate independently onto each microscope stage such that the calibration plate is positioned in the focal plane of at least one objective lens of a microscope, the microscope having a camera mounted at the image plane of the microscope and once loaded, executing a calibration routine that generates a set of calibration data for the microscope. The calibration data comprises a geometric calibration, an illumination calibration, and an optical calibration. The calibration data may be stored on the memory of each microscope or on a processor.

BRIEF DESCRIPTION OF THE DRAWINGS

These and other features, aspects, and advantages of the present invention will become better understood when the following detailed description is read with reference to the accompanying drawings in which like characters represent like parts throughout the drawings.

DETAILED DESCRIPTION

The present disclosure relates to a geometric inter-microscope calibration to enable imaging of multiple rounds across microscopes and registration of the images.

In certain embodiments, inter-microscope calibrations effectively create a common coordinate system and optical standard across multiple microscopes by calibrating the geometric, optical, and illumination properties of each microscope and referencing it to a master calibration standard. After inter-microscope calibration, the images captured between multiple microscopes are close enough in position to permit successful registration of images from multiple rounds across multiple microscopes. In certain preferred embodiments, the capability is within a maximum 3 pixel position error. The capability has been shown, in certain results, to be within a 1 pixel position error between rounds when imaging between microscopes, thus enabling imaging of multiple rounds across microscopes and registration of the acquired images. In certain embodiments, the error represents the root mean square error of the alignment of the scaled images.

In certain embodiments, a master calibration plate is used and functions as a master calibration standard. Other calibration plates, child calibration plates, are then referenced to the master plate. The master calibration plate functions in a role that is similar to a master microscope.

In certain embodiments geometric calibration provides compensation between multiple microscopes for positioning or rotation of a microscope's camera, or other image collecting device, as well as offsets, scales, and angles for the x-y-z axis of the microscopes stage. In certain embodiments, the geometric calibration comprises one or more camera rotation coefficients providing a model fit for rotation of the camera relative to a calibration plate, and one or more stage transformation factors providing a model fit for offsets, scales, and angles for the x-y-z axis of the stage relative to a calibration plate. The geometric calibration thereby addresses the focal plane variables between multiple microscopes.

In certain embodiments, optical calibration, which also may be referred to as a distortion calibration, provides compensation between microscopes for at least one of optical distortion or objective magnification.

In certain embodiments, an illumination calibration compensates for non-uniform illumination of an object. In certain embodiments, the calibration comprises at least one of an illuminated field flattening adjustment or optical power adjustment. For example the calibration may include field flatting coefficients. Field flattening is used to correct for lens distortions and is thus able to increase edge sharpness and lower the distortion of the image. In certain embodiments, the illumination calibration includes intensity adjusted scale factors. The scale factor provides a model fit for optical power of one or more combinations of illumination wave lengths and objective magnification. In certain embodiments, the intensity adjusted scale factors are derived based on a respective photon count per second.

In certain embodiments, one or more of these calibrations; geometric, optical, or illumination, may be stored in a computer memory accessible by a microscope and/or a processor to be used in a work flow.

Figure 1:
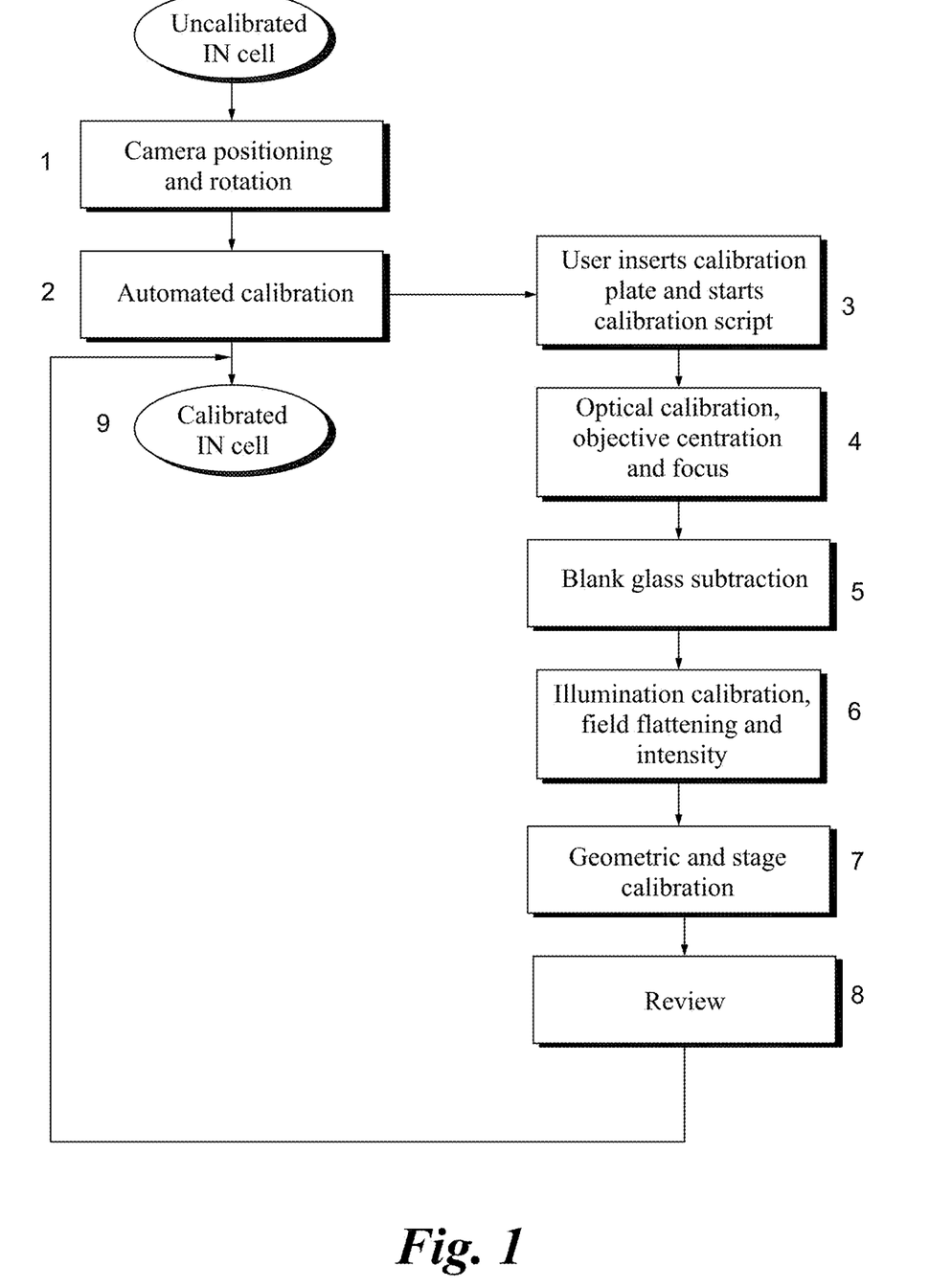
FIG. 1 is a flow diagram illustrating a method of calibrating a microscope to enable microscope-independent imaging, thus allowing image data to be processed or compared relative to additional microscopes that have undergone the same calibration process.

In certain embodiments, as shown in FIG. 1, calibrations may be used to provide a method of calibrating multiple microscopes thus allowing image data to be processed or compared relative to each other. In certain embodiments, the method involves an un-calibrated system. The system may be a microscope system and include standard aspects of a microscope. For example an objective, light source, stage and a means of adjustments for objective and the stage, as well as a camera or other image capture device, and a processor. In certain embodiments, the processor is used to run executable code. In certain embodiments, the processor may also be used as a storage device for storing images or data acquired from the microscope as well as calibration data.

In certain embodiments, the un-calibrated system may be an IN Cell Analyzer® (GE HealthCare Life Sciences, Marlborough, Mass.), to be calibrated through providing an initial set-up or alignment of the system including a camera or other optical recording device (step 1) and initiating an automated or semi-automated routine through a processor in communication with the system (steps 2 through 8) to obtain a fully calibrated microscope (step 9). The automated calibration (step 2) involves inserting a calibration plate and beginning the calibration script (step 3)—optical calibration comprising distortion correction and centering and focusing the objectives (step 4), illumination calibration comprising field flattening and intensity adjustment (step 6), and geometric calibration comprising stage and camera rotation corrections (step 7). In certain embodiments, the results are reviewed (step 8), to complete the calibration. The calibration factors may then be stored.

In certain embodiments, as shown in FIG. 1, the method may also include a compensation step for eliminating the effects of reflection of light, off either the microscope or glass used in sample mounting. This may be accomplished by subtracting an exposure-time weighted image of a raw blank glass image (step 5). In certain embodiments, since the effect of blank glass is related to image capture, this step may occur before or after step 5, thus providing more accurate measurements related to optical, illumination, and geometric calibration of a microscope system.

In certain embodiments, the geometric calibrations may be used to compensate for variations in stage scale, stage rotation, stage offsets, and camera rotation. In certain embodiments, the calibration of the microscope stage parameters and camera rotation, may be computed and stored as part of the geometric calibration. As such, the geometric calibration compensates for position of an object relative to the objective. The stage position may be referenced according to the slide coordinates; x, y, or z plane.

In certain embodiments, the illumination calibration may compensate for non-uniformity of illumination of an object. In certain embodiments, the illumination calibration comprises an intensity adjusted scale factor thus providing a model fit for optical power of one or more illumination wave lengths.

As shown in FIG. 1, in certain embodiments, the calibrations may be done automatically (step 2) by use of a processor having executable code to perform the steps. Thus one or more calibration subroutines, incorporating factors of at least one of geometric, optical, or illumination calibrations, may be used. For example a subroutine for calibration of the optical distortion, objective magnification, and camera rotation may be used, while a second stage calibration subroutine is used to determine stage scale, rotation, translation and shear. In certain embodiments, another subroutine may be used for non-uniformity of illumination. The determination of these parameters may be done within a single automated calibration script that utilizes a calibration plate as the target which may be a traceable child plate or a master calibration plate, each with its own set of calibrated parameters. In certain embodiments, the calibrations may be stored in a computer memory accessible by the microscope and or the processor.

Figure 2:
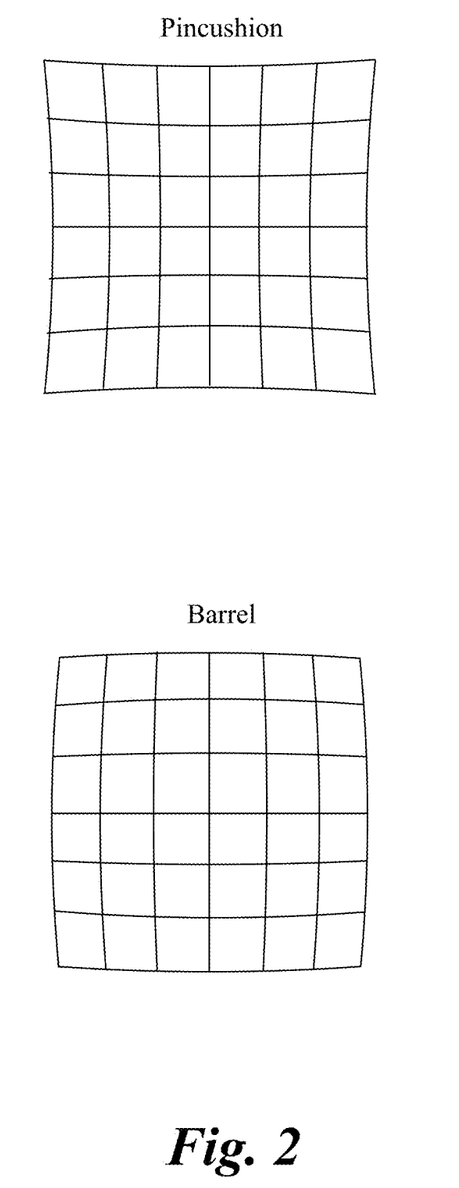
FIG. 2 depicts pin cushion and barrel distortion effects.

With regard to the optical calibration, microscope optics often exhibit varying magnification across a field of view (FOV) that results in pin cushioning or barreling distortion effects in the images (FIG. 2). When stitching distorted images, the overlapping portions of the images contain imperfectly aligned pixels that are then overlaid, which may then create ghosting/blurring in the resulting stitched image. The purpose of the distortion calibration is to compute the transfer function of the distortion within the FOV and to compensate for this distortion to remove distortion from the subsequent acquired images. For inter-microscope imaging, the optical calibration is critical for characterizing the magnification of the objectives, and therefore each FOV, and the pincushion/barrel effects on each microscope. With these calibration parameters, de-distorted images can be produced, the accurate number of FOVs and spacing between FOVs can be allocated based on the calibrated objective magnification when imaging regions, and the acquired FOVs can be appropriately rotated during stitching.

Using grid features on the calibration plate, the optical calibration subroutine computes a transfer function of the distortion within the FOV relative to an ideal model. This transfer function may be used to remove distortion from the subsequently acquired images. In certain embodiments, the objective magnification and camera rotation, a portion of the geometric calibration, may then be determined by using grid targets with a known spacing and rotation relative to the master calibration plate, and the acquired images may then be compensated to the expected magnification (i.e. 10×, 20×, 40×) and rotation. As such it is also worth noting that various subroutines may incorporate different aspects of the three calibrations; optical, geometric, and illumination.

In certain embodiments, in order to accurately characterize distortion across the entire FOV, it is beneficial to know the expected and actual pixel locations of a known feature within the FOV at many points within the FOV. In certain embodiments, grid features, which may be included on the calibration plate, may be used as the known features for optical calibration.

Figure 3:
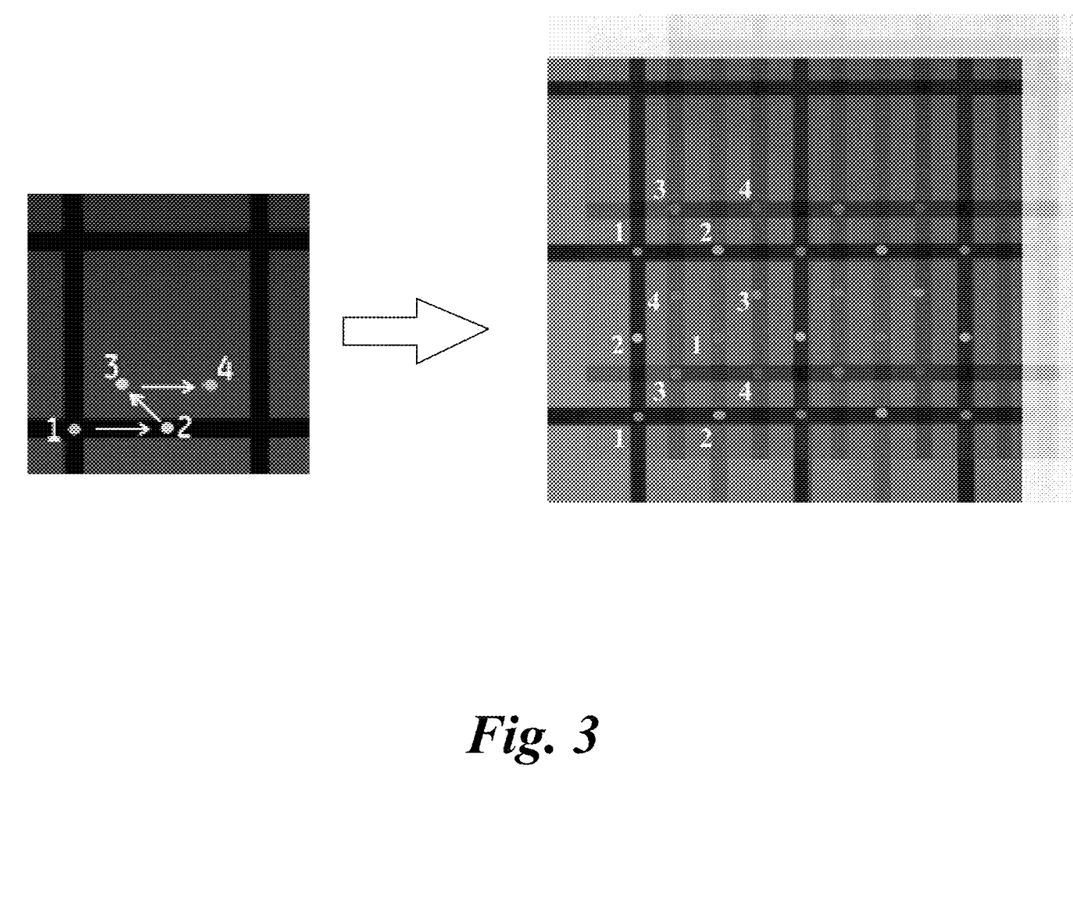
FIG. 3 is a graphical representation of the dense effective grid of control points, numbers are used to represent similar control points.

Thus, by way of example, for each objective/filter combination, 4 grid images are taken. Optical calibration is not performed for the 2× objective, since the 2× images are not used other than for scan plan operations. For the 10×, 20×, and 40× objectives, the 200 um, 100 um, and 50 um grids are used, respectively. These 4 images are taken with the purpose of creating a dense effective grid of control points, where a control point is defined in the distortion modeler as either a corner of a grid square or the center of a grid square. The grid is configured to fill the entire FOV, and then 4 images are taken at locations of (0,0), (0.5,0), (0.25,0.25), and (0.75,0.25), where each coordinate is relative to the size of a grid box (i.e. if (0,0) is the bottom-left corner of a grid box, then (1,1) refers to the top-right corner). A graphical representation of the dense effective grid of control points is shown in FIG. 3. Numbers are used to represent similar control points.

Figure 4A:
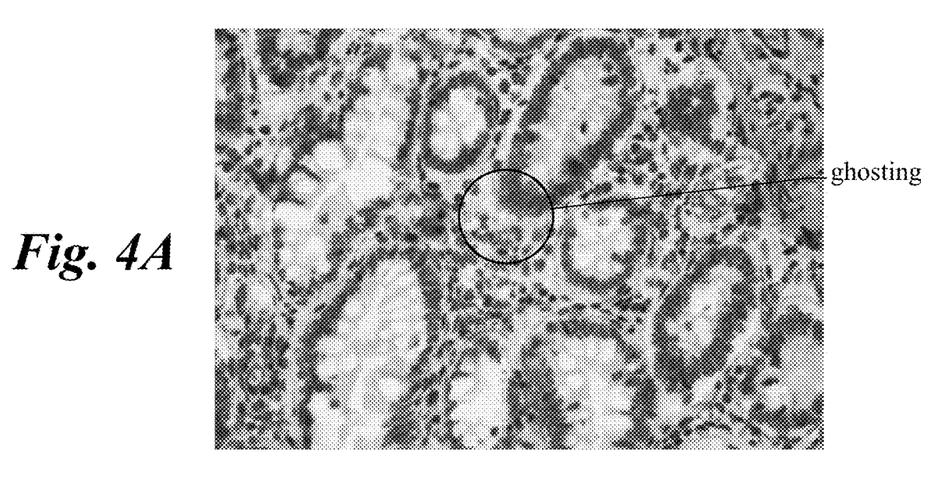
FIG. 4A is a representative original image (raw image)
Figure 4B:
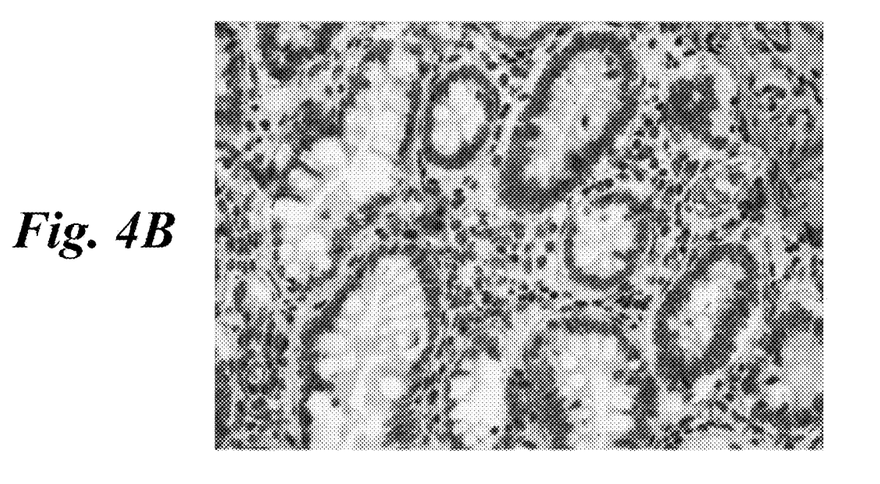
FIG. 4B is the same image as FIG. 4A corrected for distortion (distortion-corrected image).

In certain embodiments, after obtaining the optical calibration control points for various objective/filter combinations, a calibration script may be used to process or to compute the associated distortion models and the distortion model coefficients. These may be stored in the processor, in a file format for example, for each objective. When performing normal imaging, the files are copied over to the scans directory. When performing stitching, the coefficients in the files may be used to apply the inverse distortion function to produce distortion-corrected images. An example of corresponding raw and distortion-corrected images of a stained tissue sample are shown in FIGS. 4A and 4B, at an intersection corner of four FOVs. At the center of the raw image some ghosting is observed as shown in FIG. 4A, which is corrected in the distortion-corrected image as shown in FIG. 4B.

With respect to the geometric calibration, a stage calibration is needed for consistency and registration, especially as magnification requirements increase. For instance, at 40× magnification, a shift of greater than 70% of an FOV was observed between two factory-calibrated microscopes commanded to the same position.

In certain embodiments, the geometric stage calibration is designed to generate a stage matrix that includes stage scale, rotation, and shear terms for the XY axes, and stage offsets for all 3 axes. The purpose of the stage calibration is to abstract any stage-specific parameters away from the user experience, such that the user only has to worry about slide coordinates when imaging across multiple microscopes. To create this common slide coordinate system across multiple microscopes, the stage calibration works to translate commanded slide coordinates into machine-specific stage coordinates as shown in the matrix equations in FIG. 5.

Figure 5:
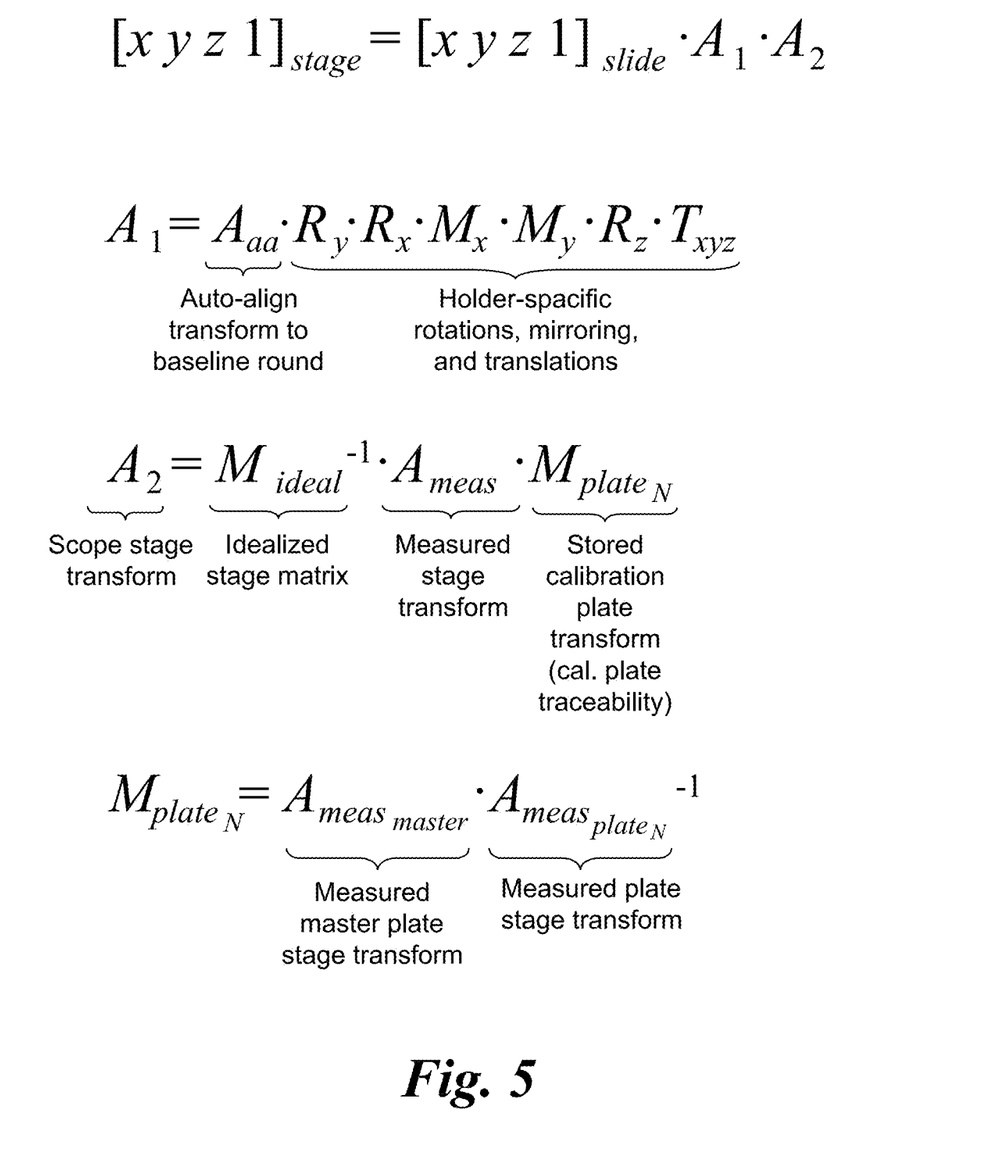
FIG. 5 is an idealized slide coordinate to stage coordinate transform equation, which includes stage scale, rotation and shear terms for the x, y axes, stage offset for all three axes, holder-specific transformations, and calibration plate transformations.

Referring again to FIG. 5, in these equations, idealized slide coordinates are translated to microscope-specific stage coordinates through matrices $A_1$ and $A_2$. $A_1$ is comprised of the auto-align transform that is computed during acquisition for a current round of imaging relative to the baseline round and holder-specific (i.e. 2 or 4 slide holder) rotation, mirror, and translation matrices. The $A_1$ matrix may have been derived or maintained from earlier calibrations. The $A_2$ matrix may then be added to represent the stage-specific parameters. The $M_{ideal}$ matrix, shown below, represents where the applied translation is $T_{xyz}$=(20 mm, 53 mm, 600 um):

$$M_{ideal} = \begin{bmatrix} 1 & 0 & 0 & 0 \\ 0 & 1 & 0 & 0 \\ 0 & 0 & 1 & 0 \\ 20 & 53 & 600 & 1 \end{bmatrix}$$

Figure 6:
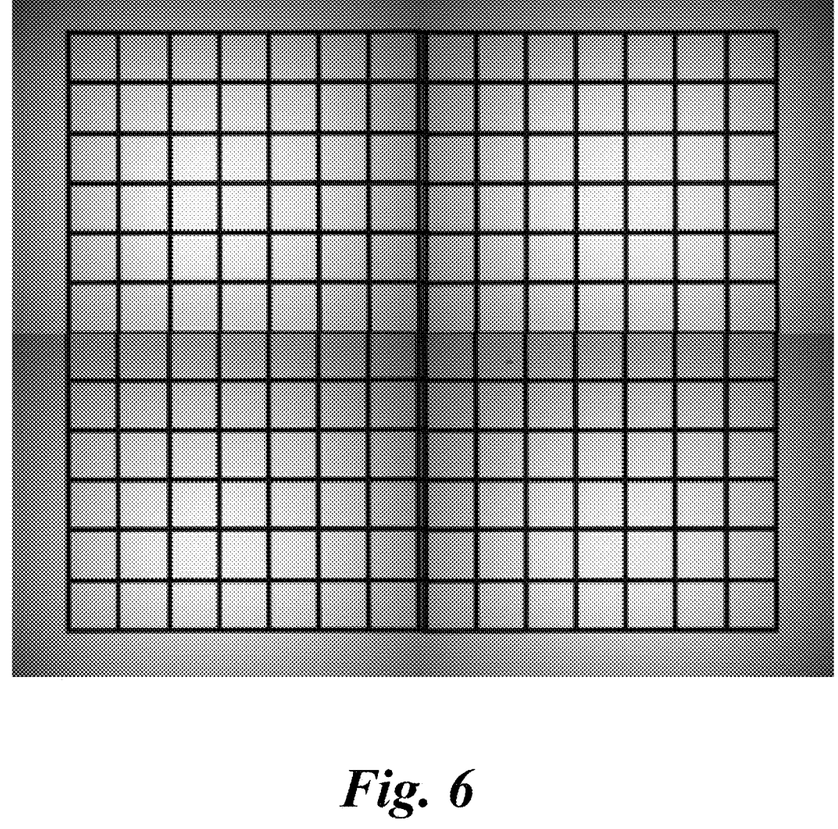
FIG. 6 is representative of acquired images during stage calibration.

The stage transform matrix $A_{meas}$, part of the geometric calibration, may then be measured directly using the stage modeler within a data base library, for example, a stitcher library. This is shown in the following example whereby a calibration script is configured to acquire grid images at 10× while introducing some stage travel by moving to each corner of the 200 um grid on the calibration plate. A montage of the 4 acquired grid images is shown in FIG. 6.

The stitcher stage modeler takes these images and the stage coordinates for each image and outputs the $A_{meas}$ matrix represented below:

$$A_{meas} = \begin{bmatrix} a_{11} & a_{12} & 0 & 0 \\ a_{21} & a_{22} & 0 & 0 \\ 0 & 0 & 1 & 0 \\ dx & dy & dz & 1 \end{bmatrix},$$

where $a_{11}$ and $a_{22}$ are indicative of the X and Y stage scales and are usually close to 1, $a_{12}$ and $a_{21}$ are indicative of the stage rotations and shear terms and are usually close to 0, and dx, dy, and dz are the offsets of the grid position relative to expected. The dz term does is not directly determined from the stitcher stage modeler, but is measured with a laser auto-focuser by the calibration script and appended to this matrix.

In certain embodiments, idealized slide coordinates may be translated to stage coordinates through composing the auto-align transform computed during acquisition relative to the baseline round and holder-specific rotation, mirror, and translation matrices ($A_1$) and ($A_2$). The $A_2$ matrix represents the stage-specific parameters and is composed from an idealized stage model of the microscope, a measured stage model using the grid targets, and a calibration plate-specific matrix that represents the grid position/scale/rotation of the calibration plate.

The stage calibration enables multiple microscopes to image a common region by commanding a common slide coordinate and the distortion calibration compensates optical features of an acquired image. Once these calibrations are in place and images have been acquired on multiple microscopes, registration algorithms complete the final alignment of the images and perform the distortion compensations to achieve geometrically indistinguishable images between microscopes.

In certain embodiments, a calibration plate is used along with its specific geometrical information such that the stage calibration results are compensated to further remove any calibration plate-specific grid offsets or rotations. The script is configured to generate the calibration plate matrix based on traceability to the master plate, similar to what has been done with intensity scaling between calibration plates. The third term in the $A_2$ matrix computation, $M_{plate_N}$, is this calibration plate matrix, and is computed by measuring the stage matrix on a given microscope for both the master calibration plate and a child plate, and then computing:

$$M_{plate_N} = A_{meas_{master}} \cdot A_{meas_{plateN}}^{-1}$$

In certain embodiments, the method provides for scaling and or transforms the image after acquisition using the calibration data. In certain other embodiments, the calibration factors may be applied prior to obtaining a raw or original image. For example, with respect to the geometric stage calibration, representative calibration parameters for the stage may be determined. These parameters may then be applied during acquisition to provide the correct physical position on the slide when the initial image is taken. In another example, regarding exposure time determination, the correct exposure time may be first determined or approximated through the calibrations. An image is then acquired with that exposure time, thus ensuring the raw image has the desired brightness. In certain other embodiments, the method is applied to post-process the image after it is acquired. In certain embodiments, this includes, but is not limited to distortion correction, field flattening, and registration.

In certain embodiments, a user may specify or load default acquisition parameters as a first set of input parameters to the microscope for image acquisition. The parameters may include for example, x-y slide coordinates for each field of view, objective magnification, illumination wavelength (channel), and exposure time. A second set of parameters may then be used from stored calibration parameters. The computing resource that is tied to the microscope uses both sets of parameters to compute a microscope-specific x-y location to move to for each FOV and to determine the amount of overlap between FOVs based on the calibrated magnification. This is especially useful, for example, when acquiring a large area comprised of many FOVs, and to calculate exposure time to use when acquiring the raw image. As such, each microscope may be configured to store its own set of calibrated parameters so that sample image acquisition can move seamlessly between the microscopes, while the user only has to supply the first set of input parameters.

As such in certain embodiments, the calibration data may be used to determine the machine-specific acquisition parameters. For example this may include commanded stage coordinates and exposure time to a specific microscope in a workflow.

EXAMPLES

As an example, experimental results for a geometric calibration are provided using a single FOV to validate inter-microscope imaging. A single FOV was acquired at the same slide coordinates on multiple microscopes and the positioning of images with and without stage calibration was compared.

Figure 7:
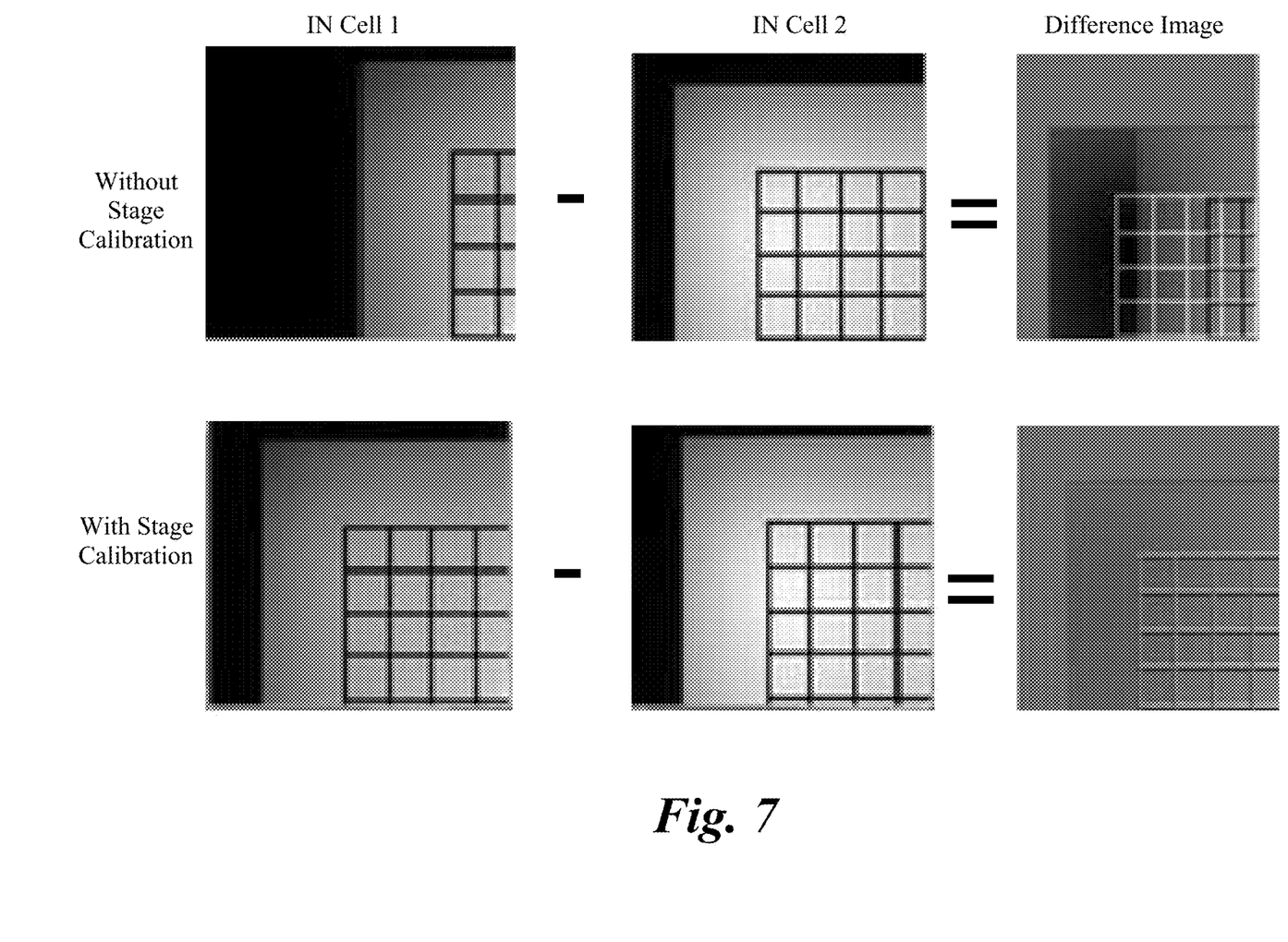
FIG. 7 is representative images showing single FOV before and after inter-microscope calibration showing two different microscope images and the relative difference without stage calibration (top row) and with stage calibration (bottom row).
Figure 8A:
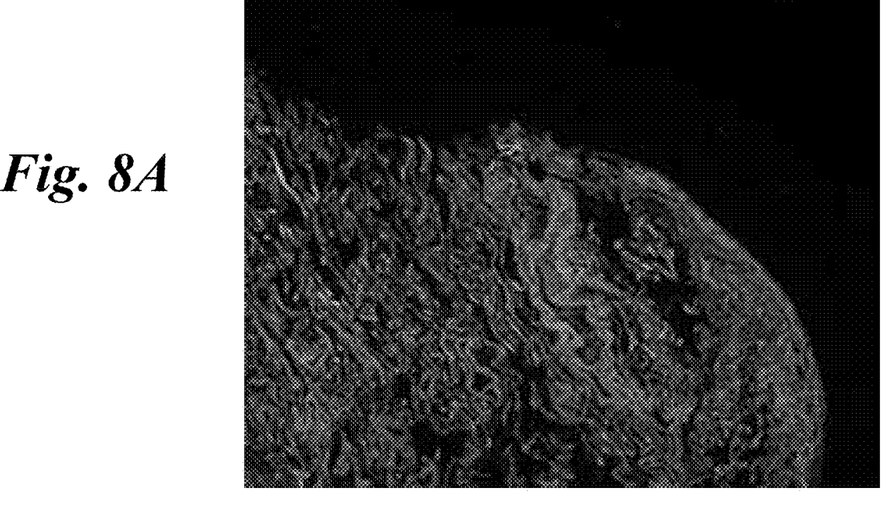
FIG. 8A is a FOV on a tissue slide captured with microscope 1.
Figure 8B:
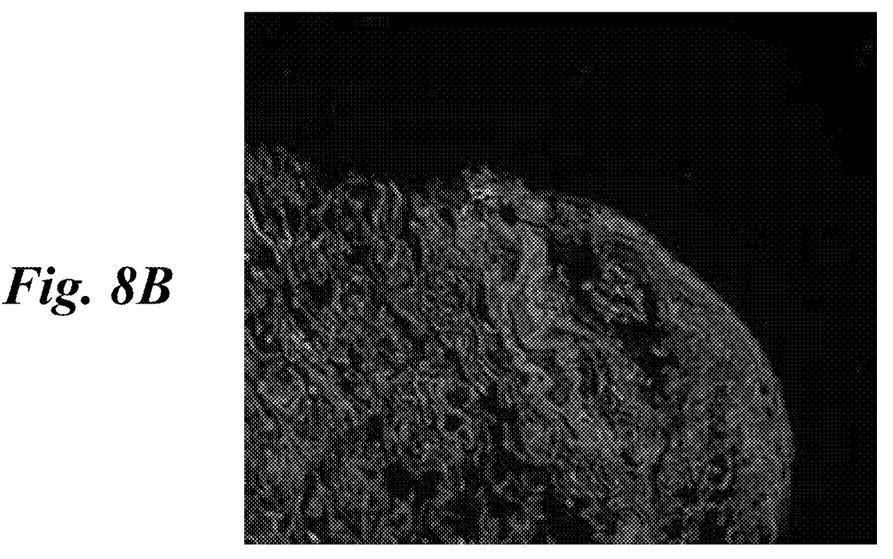
FIG. 8B is the same tissue slide, as FIG. 8A, captured with microscope 2.
Figure 9A:
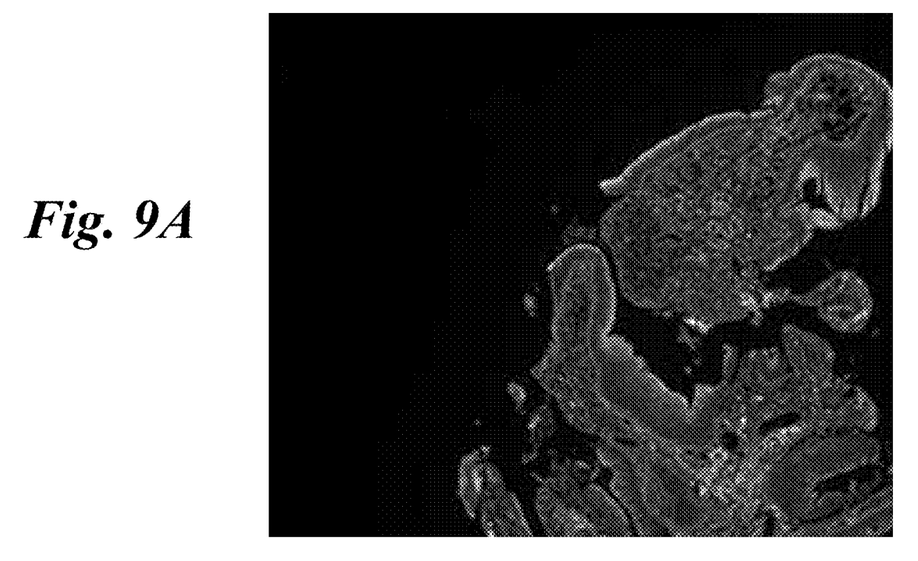
FIG. 9A is a tissue slide imaged after geometric calibration
Figure 9B:
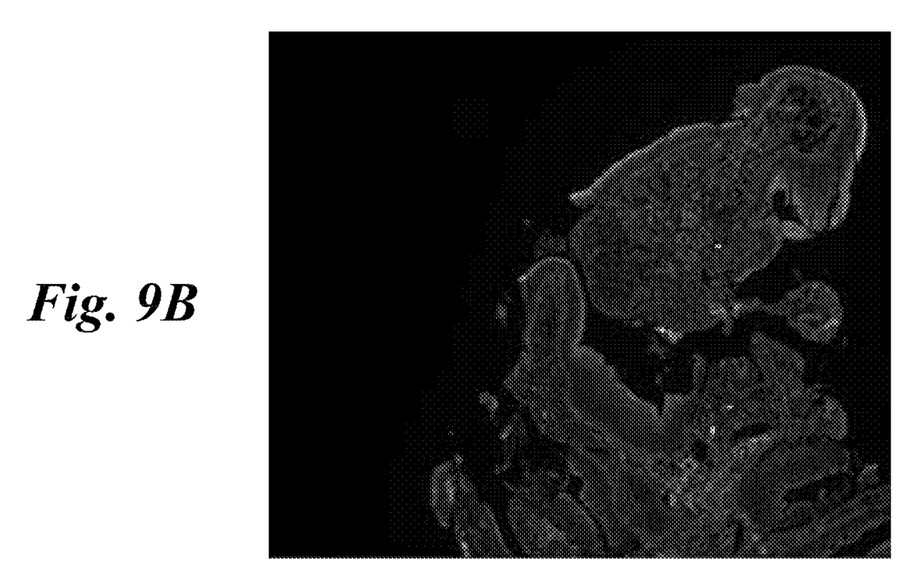
FIG. 9B is the same tissue slide, as FIG. 9A, captured with microscope 2.

As shown in FIG. 7, a single grid FOV is shown at 10× before and after running inter-microscope stage calibration. The images were obtained on two IN Cell Microscope Analyzer 2200 systems (GE HealthCare Life Sciences, Marlborough, Mass.) and referred to as IN Cell 1 and IN Cell 2 to differentiate the two systems. FIG. 7 shows the relative difference without stage calibration (top row) and with stage calibration (bottom row). FIGS. 8A and 8B, and FIGS. 9A and 9B, are images at 10× across two different FOVs, where the left image is IN Cell 1 and the right image is IN Cell 2, and each IN Cell is commanded to the same slide coordinates. More specifically FIGS. 8A and 8B is representative images of the same FOV on a tissue slide imaged on two different microscopes after geometric calibration. FIG. 8A is the image of the slide captured with microscope 1. FIG. 8*b* is the image of the slide captured with microscope 2. FIGS. 9A and 9B are representative images of the same FOV on a second tissue slide imaged on two different microscopes after geometric calibration. FIG. 9A is the slide captured with microscope 1. FIG. 9B is captured with microscope 2. As shown, the image alignment is well within a desired range for auto alignment and then registration to correct for any small shifts in position between the two microscopes in a multi-round workflow.

Figure 10A:
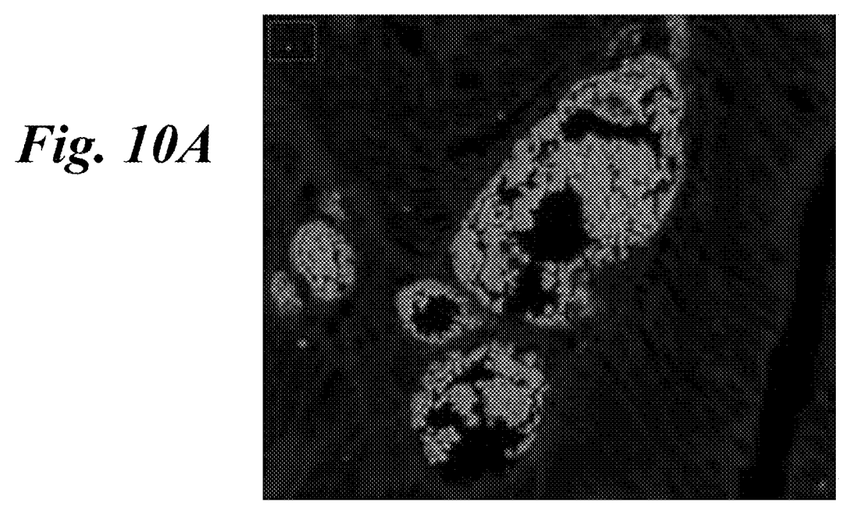
FIG. 10A is a representative image of a tissue sample for inter-microscope imaging before optical calibration taken at 10×, at the stitch center, at 200% zoom the image captured with microscope 1.
Figure 10B:
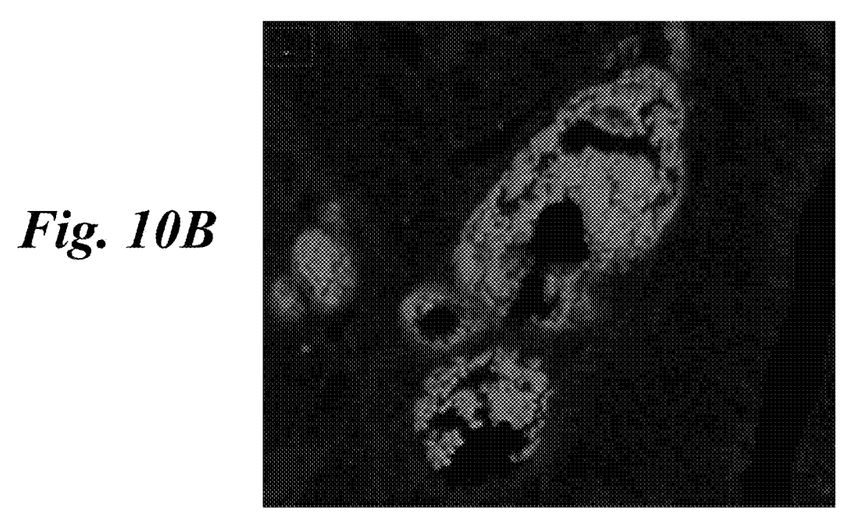
FIG. 10B is the same tissue slide, as shown in FIG. 10A, captured with microscope 2.

Experimental results from multi-round imaging were subsequently performed based on the single FOV results, involving a full tissue acquisition. The entire imaging process, including auto-align, imaging, stitching, and registration, was able to produce geometrically indistinguishable images between microscopes. As a first step, this process was attempted without stage or distortion calibration. It was found that imaging completed on both scopes at 10×, but the second scope was unable to find the ROI location using auto-align at 20× and 40× magnifications, and therefore inter-scope images were unable to be acquired. At 10×, the acquired images showed noticeable distortion effects and cropping. The distortion effects are illustrated in FIGS. 10A and 10B which shows 10× images at 200% magnification at the stitch center of a 2×2 region. FIG. 10A is the image captured with microscope 1 and FIG. 10B is the image captured with microscope 2. The stitch center is blurred in the microscope 2 image, which uses the microscope 1 image as a baseline. This blurring is due to the un-calibrated distortion effects and differences in distortion between the two microscopes.

In order to validate the process, after calibrating both microscopes with the updated automated calibration routine, two slides were imaged with two 2×2 regions each. The imaging was performed at 10×, 20×, and 40×. A summary of the results is shown in Table 1.

TABLE 1

| | | | | | |
|---|---|---|---|---|---|
| | | | Baseline | Auto-align | Exposure |
| Round | Scope # | Objective | Round | Round/Objective | time (ms) |
| Scanplan | 1 | 2x | | | 50 |
| 000 | 1 | 10x | Y | N/A | 15 |
| 001 | 1 | 10x | N | 000 (self @ 10X) | 15 |
| 002 | 2 | 10x | N | 1 (other @ 10X) | 15 |
| 003 | 2 | 20x | Y | N/A | 8 |
| 004 | 2 | 20x | N | 003 (other @ 20x) | 8 |
| 005 | 1 | 20x | N | 003 (self @ 20x) | 8 |
| 006 | 1 | 40x | Y | N/A | 10 |
| 007 | 1 | 40x | N | 006 (self @ 40X) | 10 |
| 008 | 2 | 40x | N | 006 (other @ 40x) | 10 |

The study was configured such that both microscope 1 and 2 had an opportunity to act as the baseline round, and extra rounds were acquired to compare the geometric image repeatability of a microscope to itself versus another microscope. As shown in Table 1, after the microscopes are calibrated with the new stage and distortion calibrations, each pixel in the images acquired at all magnifications differ by a maximum of only 1 pixel between microscopes. Further, it was demonstrated that the same maximum 1 pixel error exists even when imaging multiple rounds on a single microscope. It is noted that the registration algorithms are accurate to within 1 pixel demonstrating the high accuracy of the registration algorithms.

In certain embodiments, other variables may also be addressed to diminish variability across microscopes. For example, microscope calibrations may be further improved by using a holder retention mechanism, such as pins or clamps, to properly place the calibration plate on the microscope stage with a level of reproducibility. In certain embodiments an optical calibration may also be performed to calibrate intensity and field flatness across microscopes. In certain embodiments, stage variability or drift may also be considered and accounted for.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for inter-microscope calibration comprising:
    loading a calibration plate onto a microscope stage such that the calibration plate is positioned in the focal plane of at least one objective lens of a microscope, the microscope having a camera mounted at the image plane of the microscope;
    when the respective calibration plate is loaded, executing a calibration routine that generates a set of calibration data for the microscope, the calibration data comprising;
    a geometric calibration;
    an illumination calibration;
    an optical calibration;
    storing the calibration data on a memory accessible by the microscope; where the method is performed on multiple microscopes such that the multiple microscopes can be used interchangeably utilizing the stored calibration data;
    where the illumination calibration comprises; one or more field flattening coefficients providing a model fit for non-uniformity of illumination; and an intensity adjusted scale factor providing a model fit for optical power at one or more combinations of illumination wave length and objective magnification;
    where the intensity adjusted scale factors are derived based on a respective photon count per second.

2. The method of claim 1 where the geometric calibration comprises;
    one or more camera rotation coefficients providing a model fit for rotation of the camera relative to the calibration plate; and
    one or more stage transformation factors providing a model fit for at least one or more offsets, scales, and angles for the x-y-z axis of the stage relative to the calibration plate.

3. The method of claim 1, where the optical calibration comprises one or more de-distortion coefficients.

4. The method of claim 3 where the de-distortion coefficients provide a model fit for optical distortion and magnification for at least one microscope objective.

5. The method of claim 1 further comprising subtracting the effect of blank glass.

6. The method of claim 1 further comprising:
    transforming an image received by the microscope using the calibration data; and
    creating a scaled image based on the calibration data.

7. The method of claim 1; where the method further comprises:
referencing the calibration data of the geometric, optical, and illumination calibrations of each microscope of the plurality of microscopes and referencing it to a master calibration standard, whereby after inter-microscope calibration of each microscope of the plurality of microscopes, images captured between the multiple microscopes of the plurality of microscopes are close in position to permit successful registration of images from multiple rounds of calibration across the microscope of the plurality of microscopes.

8. The method of claim 7 further comprising overlaying two or more scaled images of the biological sample to create a composite image where the root mean square error of the alignment of the scaled images is less than or equal than three pixels relative to a morphological marker on the acquired images.

9. The method of claim 8 where the root means square error of the alignment is equal to or less than one pixel.

10. The method of claim 8 where the scaled images are used in a multiplexing workflow for detecting at least one of RNA, DNA, or protein on the surface of the biological sample.

11. The method of claim 1 where the calibration plate comprises grid features for stage alignment and geometric calibration.

12. The method of claim 1 wherein executing the calibration routine comprises executing an automated calibration routine on a processing component in communication with the microscope.

13. A method of acquiring images for image registration on different microscopes, comprising:
receiving an imaging protocol specifying one or more image acquisition parameters for imaging a sample provided on a stage of a calibrated microscope, wherein the image acquisition parameters comprise;
a geometric calibration;
an illumination calibration; and
an optical calibration; and
acquiring one or more images of the sample using the specified image acquisition parameters; and
storing the calibration data on a memory accessible by the microscope; where the method is performed on multiple microscopes such that the multiple microscopes can be used interchangeably utilizing the stored calibration data;
where the illumination calibration comprises; one or more field flattening coefficients providing a model fit for non-uniformity of illumination; and an intensity adjusted scale factor providing a model fit for optical power at one or more combinations of illumination wave length and objective magnification;
where the intensity adjusted scale factors are derived based on a respective photon count per second.

14. The method of claim 13 where the geometric calibration comprises:
one or more camera rotation coefficients providing a model fit for rotation of the camera relative to the calibration plate; and
one or more stage transformation factors providing a model fit for offsets, scales, and angles for the x-y-z axis of the stage relative to the calibration plate.

15. The method of claim 14 where the stage transformation comprises a stage modeler to allow for at least one of positioning and moving the sample on the stage.

16. The method of claim 13, where the optical calibration comprises one or more de-distortion coefficients.

17. The method of claim 16 where the de-distortion coefficients provide a model fit for optical distortion and magnification for at least one microscope objective.

18. The method of claim 13 where the sample is a biological sample.

19. The method of claim 18 further comprising overlaying two or more scaled images of the biological sample to create a composite image where the root mean square error of the alignment of the scaled images is less than or equal than three pixels relative to a morphological marker on the acquired images.

20. The method of claim 19 where the root means square error of the alignment is equal to or less than one pixel.

21. The method of claim 13 where the acquired images are obtained in a multiplexing workflow detecting at least one of RNA, DNA, or protein on the surface of the biological sample.

22. The method of claim 13 wherein executing the calibration routine comprises executing an automated or semi-automated calibration routine on a processing component in communication with the microscope.

23. A method for inter-microscope calibration comprising:
loading a calibration plate onto a microscope stage of a microscope, such that the calibration plate is positioned in the focal plane of at least one objective lens of a microscope, the microscope having a camera mounted at the image plane of the microscope;
when the respective calibration plate is loaded, executing a calibration routine that generates a set of calibration data for the microscope, the calibration data comprising;
a geometric calibration comprising;
one or more camera rotation coefficients providing a model fit for rotation of the camera relative to the calibration plate; and
one or more stage transformation factors providing a model fit for offsets, scales, and angles for the x-y-z axis of the stage relative to the calibration plate;
an illumination calibration comprising;
one or more field flatting coefficients providing a model fit for non-uniformity of illumination;
an intensity adjusted scale factor providing a model fit for optical power of one or more illumination wave lengths;
an optical calibration comprising one or more de-distortion coefficients, where the de-distortion coefficients provide a model fit for optical distortion and magnification for at least one microscope objective; and
storing the calibration data on a memory accessible by the microscope; where the method is performed on multiple microscopes such that the multiple microscopes can be used interchangeably utilizing the stored calibration data,
where the illumination calibration comprises; one or more field flattening coefficients providing a model fit for non-uniformity of illumination; and an intensity adjusted scale factor providing a model fit for optical power at one or more combinations of illumination wave length and objective magnification;
where the intensity adjusted scale factors are derived based on a respective photon count per second.

24. The method of claim 23 further comprising:
utilizing the calibration data to determine the microscope acquisition parameters, transforming an image taken with the microscope using the calibration data; and creating a scaled image based on the calibration data.

25. The method of claim 23 further comprising referencing the calibration data of the geometric, optical, and illumination calibrations of each microscope of the plurality of microscopes and referencing it to a master calibration standard, whereby after inter-microscope calibration of each microscope of the plurality of microscopes, images captured between the multiple microscopes of the plurality of microscopes are close in position to permit successful registration of images from multiple rounds of calibration across the microscope of the plurality of microscopes.

* * * * *